United States Patent
Enapakurthi et al.

(10) Patent No.: US 12,397,639 B2
(45) Date of Patent: Aug. 26, 2025

(54) MECHANISM FOR REPOSITIONING VEHICLE SAFETY ALERTS DURING DISPLAY HARDWARE ISSUES

(71) Applicant: QUALCOMM Incorporated, San Diego, CA (US)

(72) Inventors: Vinod Kumar Enapakurthi, Vizianagaram Andhra Pradesh (IN); Raviteja Veerella, Bangalore (IN); Ramakrishna Pallala, Bangalore (IN); Rajendra Varma Pusapati, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 18/467,128

(22) Filed: Sep. 14, 2023

(65) Prior Publication Data
US 2025/0091436 A1    Mar. 20, 2025

(51) Int. Cl.
*B60K 35/00* (2024.01)
*B60K 35/22* (2024.01)
*B60K 35/28* (2024.01)

(52) U.S. Cl.
CPC .............. *B60K 35/00* (2013.01); *B60K 35/22* (2024.01); *B60K 35/28* (2024.01); *B60K 2360/164* (2024.01); *B60K 2360/178* (2024.01)

(58) Field of Classification Search
CPC ........ B60K 35/00; B60K 35/22; B60K 35/28; B60K 2360/164; B60K 2360/178; B60K 35/10; B60K 35/213; B60K 35/29; B60K 35/60; B60K 35/81; B60W 2050/0006; B60W 50/029; B60W 2050/146
See application file for complete search history.

(56) References Cited

U.S. PATENT DOCUMENTS

| | | | |
|---|---|---|---|
| 10,235,122 B1 | 3/2019 | Goel et al. | |
| 11,001,143 B2 | 5/2021 | Gulati et al. | |
| 11,978,122 B1* | 5/2024 | Binion | G06Q 40/08 |
| 12,236,156 B2* | 2/2025 | Lee | B60K 35/50 |
| 2019/0197651 A1* | 6/2019 | Johnson | B60K 35/90 |
| 2020/0218487 A1* | 7/2020 | Rush | B60R 11/0229 |
| 2023/0012768 A1 | 1/2023 | Oishi et al. | |
| 2023/0049671 A1* | 2/2023 | Cheng | B60K 35/22 |
| 2023/0221964 A1* | 7/2023 | Takahashi | G06F 3/14 |
| | | | 719/319 |
| 2024/0083252 A1* | 3/2024 | Kamiya | B60R 11/02 |

FOREIGN PATENT DOCUMENTS

KR    20210155596 A    12/2021

OTHER PUBLICATIONS

International Search Report and Written Opinion—PCT/US2024/039287—ISA/EPO—Feb. 25, 2025.

* cited by examiner

Primary Examiner — Richard M Camby
(74) Attorney, Agent, or Firm — Muncy, Geissler, Olds & Lowe, P.C.

(57) ABSTRACT

Various embodiments include methods and vehicle processing systems for repositioning safety critical information from a primary cluster display to another vehicle display in the event that the primary cluster display malfunctions or otherwise cannot display that information. Embodiments may include recognizing when there is a malfunction in the primary cluster display, and operations that enable safety critical information to be rendered on a different display, such as a display of a vehicle infotainment system.

20 Claims, 10 Drawing Sheets

MECHANISM FOR REPOSITIONING VEHICLE SAFETY ALERTS DURING DISPLAY HARDWARE ISSUES

BACKGROUND

Present generation vehicles are typically equipped with multiple electronic displays, including displays for vehicle information (e.g., speedometers, odometers, safety information etcetera.), and infotainment system displays of which there may be several. The different displays within a vehicle may be controlled by one or more vehicle processing systems. In a common architecture, the vehicle processing system may be organized to execute multiple independent virtual machines with a hypervisor solution that manages memory accesses by the virtual machines. Such virtual machines may use different operating systems based on different applications and customer requirements.

In a common vehicle architecture, a primary virtual machine may control the display of vehicle information within the primary vehicle status information display, which is refer to herein as the vehicle information cluster display (or simply the cluster display), while a guest virtual machine controls the display of infotainment information on one or more infotainment displays. In some implementations, the infotainment system and infotainment display may operate using the Android operating system.

The vehicle information cluster display is typically situated in front of the driver behind the steering wheel. This display will typically include graphics and text that informs the driver of critical vehicle status information, such as speed, odometry and tachometry. In vehicles equipped with driver assist systems, the vehicle information cluster display will also include safety critical information to inform the driver of information important to the safe operation of the vehicle, such as collision avoidance warnings, activated driver assist settings, blind spot monitoring, lane departure assist, tire pressure monitoring, fuel status, and the like. Typically, the vehicle information cluster display provides information that is relevant only to the driver In contrast, the infotainment display or displays may include information related to available or playing media, navigation information (e.g., map displays), applications, and other general vehicle information. Typically, infotainment systems are configured to be operated by any vehicle occupant.

SUMMARY

Various aspects include methods that may be performed by a vehicle processing system for repositioning safety critical information to alternative displays when a primary display malfunctions. Various aspects include methods and vehicle processing systems performing the methods for managing the display of vehicle safety critical information on displays of a vehicle, which may include monitoring for failure of a first display on which safety critical information is normally displayed, and rendering the safety critical information on a second display in response to detecting failure of the first display.

In some aspects, rending the safety critical information on the second display in response to detecting failure of the first display may include identifying a region of interest within the first display in which the safety critical information should appear, and rendering the region of interest in the second display. monitoring for failure of the first display may include comparing a cyclic redundancy check (CRC) on data for rendering of safety critical information to a CRC on data displayed of the first display in the region of interest where the safety critical information should appear, and detecting failure of the first display in response to a mismatch between the CRC on data for rendering of safety critical information and the CRC on data displayed of the first display in the region of interest where the safety critical information should appear. In some aspects, the safety critical information may be a fraction of information that is or should be displayed on the first display and the region of interest may be a fraction of the first display encompassing the safety critical information.

In some aspects, the first display may be a vehicle status cluster display and the second display may be an infotainment display. In some aspects, generation of safety critical information and rendering of the safety critical information on the first display may be controlled by a primary virtual machine executing in a processing system of the vehicle, the infotainment display may be controlled by a guest virtual machine executing in the processing system of the vehicle, and rending the safety critical information on the second display may include the primary virtual machine providing to the guest virtual machine with access to memory where data for rendering the safety critical information is stored, and the guest virtual machine accessing the data for rendering of safety critical information and using the data to render the safety critical information on the second display. In some aspects, rending the safety critical information on the second display further may include the guest virtual machine allocating a fraction of the infotainment display for rendering the safety critical information and adjusting rendering of infotainment related information.

Further aspects include a vehicle computing device including a memory and a processing system configured to perform operations of any of the methods summarized above. Further aspects include a non-transitory processor-readable storage medium having stored thereon processor-executable software instructions configured to cause one or more processors of a processing system to perform operations of any of the methods summarized above. Further aspects include a computing device having means for accomplishing functions of any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1:
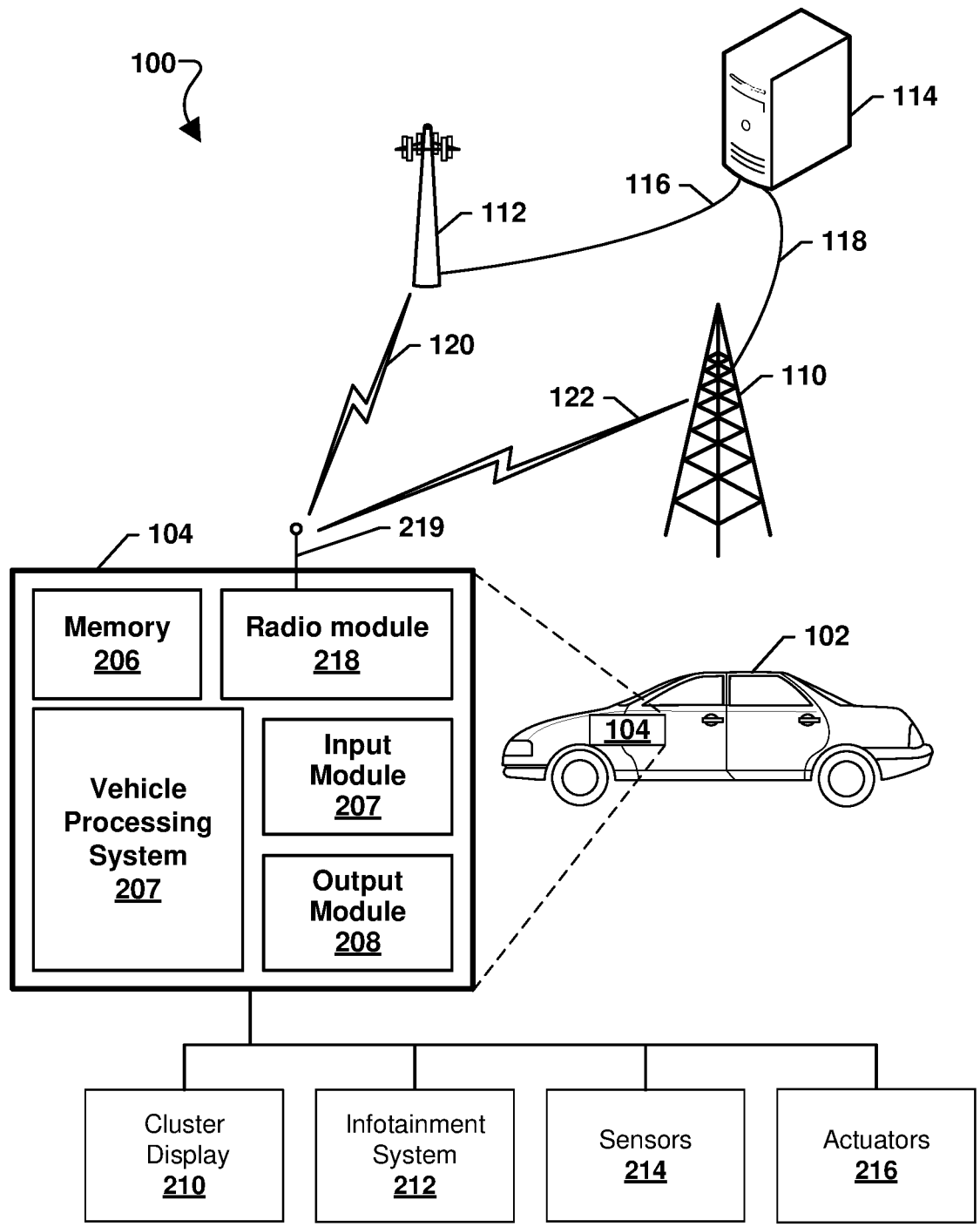
FIG. 1 is a component diagram of an example vehicle processing system suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various aspects include methods and vehicle processing systems performing the methods for managing the display of vehicle safety critical information on displays of a vehicle. Various embodiments may include the vehicle processing monitoring information to detect a failure or malfunction of a first or primary display on which safety critical information is normally displayed, such as the vehicle's information cluster display. In response to recognizing that the first or primary display is not presenting the safety critical information for viewing by the driver, the processing system may perform operations to display the safety critical information on a second display, such as on a infotainment display of the vehicle's infotainment system. As safety critical information displays may be controlled by a primary virtual machine executing in the vehicle processing system and the infotainment display may be controlled by a guest virtual machine, some embodiments may include operations to give the guest virtual machine access to memory where data for rendering the safety critical information is stored. Rendering on the second display may also involve reconfiguring information presented on the display to make room for the safety critical information.

A virtual machine (VM) is a software solution that provides an interface between application programs and the physical hardware, potentially allowing application programs tied to a specific instruction set architecture (ISA) to execute on hardware implementing a different ISA. Virtual machine solutions may include a "hypervisor" or virtual machine monitor (VMM) that runs on actual hardware (native) or on top of an operating system (hosted) to emulate the hardware ISA and/or to otherwise provide the application programs with virtualized hardware resources. Each virtual machine may have its own separate operating system image, binaries, libraries, and software applications. As such, each virtual machine may be many gigabytes in size.

As used herein, the term "vehicle" refers generally to any of an automobile, motorcycle, truck, bus, boat, and any other type of vehicle that may be configured with a processing system for managing displays of information, particularly safety-related information.

As used herein, the term "processing system" is used herein to refer to one more processors, including multi-core processors, that are organized and configured to perform various computing functions. Various embodiment methods may be implemented in one or more of multiple processors within a vehicle processing system as described herein.

Vehicles are increasingly being configured with sophisticated computing systems that perform automated driving functions such as Advanced Driver Assistance Systems (ADAS) that provide various forms of assistance to drivers, including displaying safety critical information such as collision assist, blind spot monitoring, lane departure assist, tire pressure monitoring, fuel indication, and the like.

While the safety critical information provided to drivers within the vehicle information cluster display can significantly improve the safe operation of the vehicle, the importance of this information two drivers used to the ADAS system may create a problem if this information is no longer displayed. For example, if the cluster display goes blank while driving on a highway, the driver may be confused or become concerned by the absence of safety critical information. Currently there is no mechanism available to route the safety critical information to another display within the vehicle if the cluster display malfunctions, if the cluster display stops working, the driver will be unaware of safety critical information of the vehicle as well as other ADAS information.

Various embodiments include methods and systems that may monitor the condition of the vehicle information cluster display to detect when there is a malfunction or the display is disconnected, and thus critical safety information is not being presented to the driver, and when such conditions are detected, automatically move the safety critical information to be rendered on another display of the vehicle, such as the infotainment display. To enable the display of safety critical information the entertainment display may be modified or reconfigured to render a region of interest including the safety critical information in addition to the normal infotainment information display.

Various embodiments improve the safety and operation of vehicles by providing mechanisms for relocating displays of safety critical information when the display on which such information is normally presented (e.g., the vehicle information cluster display) malfunctions or is unavailable, such as by presenting the information on an infotainment display. By insuring that safety critical information remains visible to the driver, drivers make continue to receive the benefit that information even when the main cluster display fails.

FIG. 1 is a component diagram of an example vehicle processing system 100 including a suitable for implementing various embodiments. The processing system 100 may include a vehicle 102 that includes a vehicle processing system 104. The vehicle processing system 104 may communicate with various systems and devices, such as a vehicle information cluster display 210, an infotainment system 212, various sensors 214, various actuators 216, and a radio module 218 coupled to an antenna 219. The vehicle processing system 104 also may communicate with roadside units 112, cellular communication network base stations 110, and other external devices, e.g., via wireless communication links 120 and 122. The vehicle processing system 104 also may communicate with a network computing device 114 via the roadside units 112 and/or the cellular communication network base stations 110, e.g., via wired communication links 116 and 118. The network computing device 114 may be part of a communication network (e.g., a core network), or may be configured to communicate via a communication network with the roadside units 112, cellular communication network base stations 110, and the vehicle processing system 104.

The vehicle processing system 104 may include a processor 205, memory 206, an input module 207, an output module 208 and the radio module 218. The processor 205 may be coupled to the memory 206 (i.e., a non-transitory storage medium), and may be configured with processor-executable instructions stored in the memory 206 to perform operations of the methods according to various embodiments described herein. Also, the processor 205 may be coupled to the output module 208, which may control in-vehicle displays, and to the input module 207 to receive information from vehicle sensors as well as driver inputs.

The vehicle processing system 104 may include a V2X antenna 219 coupled to the radio module 218 that is configured to communicate with one or more Intelligent Transport System (ITS) participants (e.g., stations), a roadside unit 112, and a base station 110 or another suitable network access point. The V2X antenna 219 and radio module 218 may be configured to receive dynamic traffic flow feature information via vehicle-to-everything (V2X) communications. In various embodiments, the vehicle processing system may receive information from a plurality of information sources, such as the vehicle information cluster display 210, infotainment system 212, various sensors 214, various actuators 216, and the radio module 218. The vehicle processing system may be configured to provide drivers with safety critical information and other driver assistance using map data in addition to sensor data, as further described below.

Examples of vehicle sensors 214 include a location determining system (such as a Global Navigation Satellite Systems (GNSS) system, a camera, and other suitable sensor devices and systems. Examples of vehicle actuators 216 include various physical control systems such as for steering, brakes, engine operation, lights, directional signals, and the like.

Figure 2:
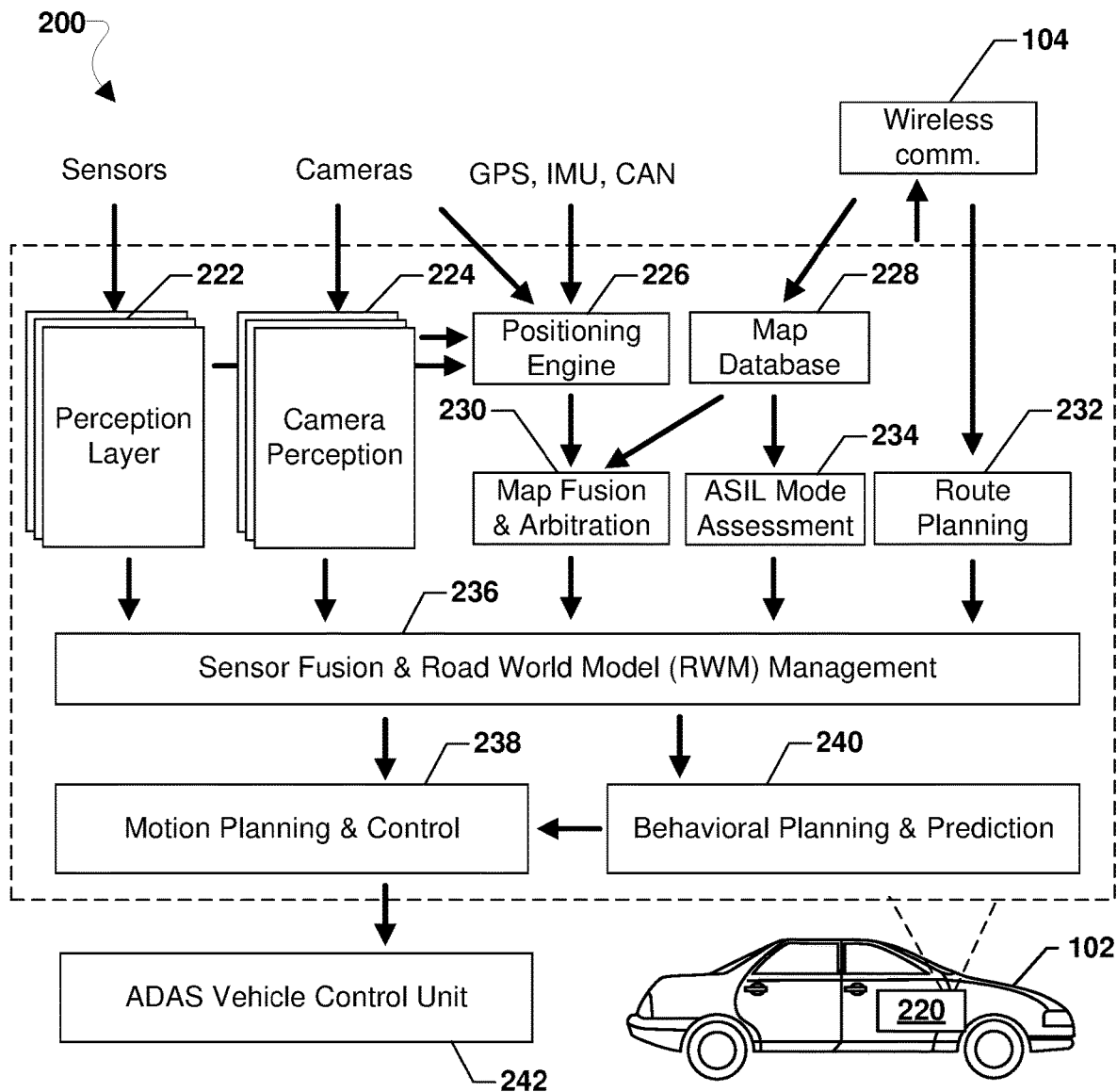
FIG. 2 is a component block diagram illustrating components of an example vehicle processing system suitable for implementing various embodiments.

FIG. 2 is a component block diagram illustrating components of an example vehicle processing system 200 suitable for implementing various embodiments. With reference to FIGS. 1-2, the vehicle processing system 200, which may include an advanced driver assistance system (ADAS), may be coupled to the vehicle processing system 104. The vehicle processing system 200 may include various subsystems, communication elements, computational elements, computing devices or units which may be utilized within a vehicle 102. The various computational elements, computing devices or units within the vehicle processing system 200 may be implemented within a system of computing devices (i.e., subsystems) that communicate data and commands to each other via the vehicle information cluster display 210 (e.g., indicated by the arrows in FIG. 2). In some implementations, the various computational elements, computing devices or units within the vehicle processing system 200 may be implemented within a single computing device, such as separate threads, processes, algorithms or computational elements. Therefore, each subsystem/computational element illustrated in FIG. 2 is also generally referred to herein as a "layer" within a computational "stack" that constitutes the vehicle processing system 200. However, the use of the terms layer and stack in describing various embodiments are not intended to imply or require that the corresponding functionality is implemented within a single vehicle computing device, although that is a potential implementation embodiment. Rather the use of the term "layer" is intended to encompass subsystems with independent processors, computational elements (e.g., threads, algorithms, subroutines, etc.) running in one or more computing devices, and combinations of subsystems and computational elements.

The vehicle processing system 200 may include a sensor perception layer 222, a camera perception layer 224, a positioning engine layer 226, a map database 228, a map fusion and arbitration layer 230, a route planning layer 232, an operating mode assessment layer 234, a sensor fusion and road world model (RWM) management layer 236, a motion planning and control layer 238, and a behavioral planning and prediction layer 240. The layers 222-240 are merely examples of some layers in one example configuration of the vehicle processing system 200. In other configurations, other layers may be included, such as additional layers for other perception sensors, additional layers for planning and/or control, additional layers for modeling, etc., and/or certain of the layers 222-240 may be excluded from the vehicle processing system 200. Each of the layers 222-240 may exchange data, computational results and commands as illustrated by the arrows in FIG. 2.

Further, the vehicle processing system 200 may receive and process data from sensors (e.g., cameras, inertial measurement units (IMU) etc.), navigation information sources (e.g., Global Positioning System (GPS) receivers, IMUs, etc.), vehicle networks (e.g., Controller Area Network (CAN) bus), and databases in memory (e.g., digital map data).

The vehicle processing system 200 may output vehicle control commands or signals to an ADAS vehicle control unit 242, which is a system, subsystem or computing device that interfaces directly with vehicle steering, throttle and brake controls. The configuration of the vehicle processing system 200 and ADAS vehicle control unit 242 illustrated in FIG. 1 is merely an example configuration and other configurations of a vehicle management system and other vehicle components may be used. As an example, the configuration of the vehicle processing system 200 and ADAS vehicle control unit 242 illustrated in FIG. 2 may be used in a vehicle configured to provide ADAS functions including providing drivers with safety critical information and other driver assistance.

The perception layer 222 may receive data from one or more detection and ranging sensors, and process the data to recognize and determine locations of other vehicles and objects within a vicinity of the vehicle 102. The perception layer 222 may include use of neural network processing and artificial intelligence methods to recognize objects and vehicles, and pass such information on to the sensor fusion and RWM management layer 236.

The camera perception layer 224 may receive data from one or more cameras, such as cameras, and process the data to recognize and determine locations of other vehicles and objects within a vicinity of the vehicle 102. The camera perception layer 224 may include use of neural network processing and artificial intelligence methods to recognize objects and vehicles, and pass such information on to the sensor fusion and RWM management layer 236.

The positioning engine layer 226 may receive data from the perception layer 222, the camera perception layer 224, and various sources of navigation information, and process the data and information to determine a position of the vehicle 102. Various sources of navigation information may include, but is not limited to, a GPS receiver, an IMU, and/or other sources and sensors connected via a CAN bus. The positioning engine layer 226 may also utilize inputs from one or more cameras, such as cameras and/or any other available sensor capable of identifying and determining directions and distances to objects in the vicinity of the vehicle.

The vehicle processing system 200 may include or be coupled to a vehicle processing system 104 according to various embodiments. One or more of the layers 222-240 may provide information to or receive information from the vehicle processing system 104. The vehicle processing system 104 may be configured to communicate with highway communication systems, such as via V2X communication links (e.g., 124) and/or to remote information sources (e.g., computing device 132) via cellular wireless communication links (e.g., 122), such as via 5G cellular networks.

The map fusion and arbitration layer 230 may access the map database 228 for location information regarding nearby objects and features, and receive localizing/navigation information output from the positioning engine layer 226, and process the data to further determine the position of the vehicle 102 within the map, such as location within a lane of traffic, position within a street map, etc. sensor data may be stored in a memory (e.g., memory 312).

Similar to location information in some map objects and features and sensor accuracy and precision, GPS position fixes include some error, so the map fusion and arbitration layer 230 may function to determine a best guess location of the vehicle within a roadway based upon an arbitration between the GPS coordinates, sensor data, and map data regarding objects and features in and near the roadway. For example, while GPS coordinates may place the vehicle near the middle of a two-lane road in the sensor data, the map fusion and arbitration layer 230 may determine from the direction of travel that the vehicle is most likely aligned with the travel lane consistent with the direction of travel. The map fusion and arbitration layer 230 may pass arbitrated map location information to the sensor fusion and RWM management layer 236.

The route planning layer 232 may utilize sensor data, as well as inputs from an operator or dispatcher to plan a route to be followed by the vehicle 102 to a particular destination. The route planning layer 232 may pass map-based location information to the sensor fusion and RWM management layer 236. However, the use of a prior map by other layers, such as the sensor fusion and RWM management layer 236, etc., is not required. For example, other stacks may operate and/or control the vehicle based on perceptual data alone without a provided map, constructing lanes, boundaries, and the notion of a local map as perceptual data is received.

In embodiments including an operating mode assessment layer 234, that processing layer may use safety and/or confidence information regarding nearby objects and features to select an appropriate ADAS safety critical information warning or notice. In some embodiments, the operating mode assessment layer 234 may determine whether a potential hazard is present in view of safety and/or confidence information regarding nearby objects and features in the driving environment, and may generate a safety critical information for display to the driver (e.g., on the cluster display 210) when the driver should be made aware of potential hazards.

The sensor fusion and RWM management layer 236 may receive data and outputs produced by the perception layer 222, camera perception layer 224, map fusion and arbitration layer 230, route planning layer 232, and the operating mode assessment layer 234, and use some or all of such inputs to estimate or refine the location and state of the vehicle 102 in relation to the road, other vehicles on the road, and other objects within a vicinity of the vehicle 102.

The behavioral planning and prediction layer 240 of the vehicle processing system 200 may use the refined location and state information of the vehicle 102 and location and state information of other vehicles and objects output from the sensor fusion and RWM management layer 236 to predict future behaviors of other vehicles and/or objects. The behavioral planning and prediction layer 240 may output other vehicle and object behavior and location predictions to the motion planning and control layer 238. Additionally, the behavior planning and prediction layer 240 may use object behavior in combination with location predictions to plan and generate control signals for controlling the motion of the vehicle 102, such as applying brakes.

The motion planning and control layer 238 may receive data and information outputs from the sensor fusion and RWM management layer 236, map data from the map database 232, and other vehicle and object behavior as well as location predictions from the behavior planning and prediction layer 240, and use this information to plan and generate control signals for controlling the motion of the vehicle 102 and to verify that such control signals meet safety requirements for the vehicle 102.

The ADAS vehicle control unit 242 may receive the commands or instructions from the motion planning and control layer 238 and translate such information into mechanical control signals for controlling wheel angle, brakes and throttle of the vehicle 102. For example, the ADAS vehicle control unit 242 may respond to an automatic braking command angle by sending corresponding control signals to the vehicle brakes.

In various embodiments, the vehicle processing system 200 may include functionality that performs safety checks or oversight of various commands, planning or other decisions of various layers that could impact vehicle and occupant safety. Such safety check or oversight functionality may be implemented within a dedicated layer or distributed among various layers and included as part of the functionality. In some embodiments, a variety of safety parameters may be stored in memory and the safety checks or oversight functionality may compare a determined value (e.g., relative spacing to a nearby vehicle, distance from the roadway centerline, etc.) to corresponding safety parameter(s), and issue a warning or command if the safety parameter is or will be violated. For example, a safety or oversight function in the behavior planning and prediction layer 240 (or in a separate layer) may determine the current or future separate distance between another vehicle (as defined by the sensor fusion and RWM management layer 236) and the vehicle (e.g., based on the world model refined by the sensor fusion and RWM management layer 236), compare that separation distance to a safe separation distance parameter stored in memory, and issue instructions to the motion planning and control layer 238 to speed up, slow down or turn if the current or predicted separation distance violates the safe separation distance parameter. As another example, safety or oversight functionality in the motion planning and control layer 238 (or a separate layer) may compare a determined or commanded steering wheel command angle to a safe wheel angle limit or parameter, and issue an override command and/or alarm in response to the commanded angle exceeding the safe wheel angle limit.

Some safety parameters stored in memory may be static (i.e., unchanging over time), such as maximum vehicle speed. Other safety parameters stored in memory may be dynamic in that the parameters are determined or updated continuously or periodically based on vehicle state information and/or environmental conditions. Non-limiting examples of safety parameters include maximum safe speed, maximum brake pressure, maximum acceleration, and the safe wheel angle limit, all of which may be a function of roadway and weather conditions.

Figure 3:
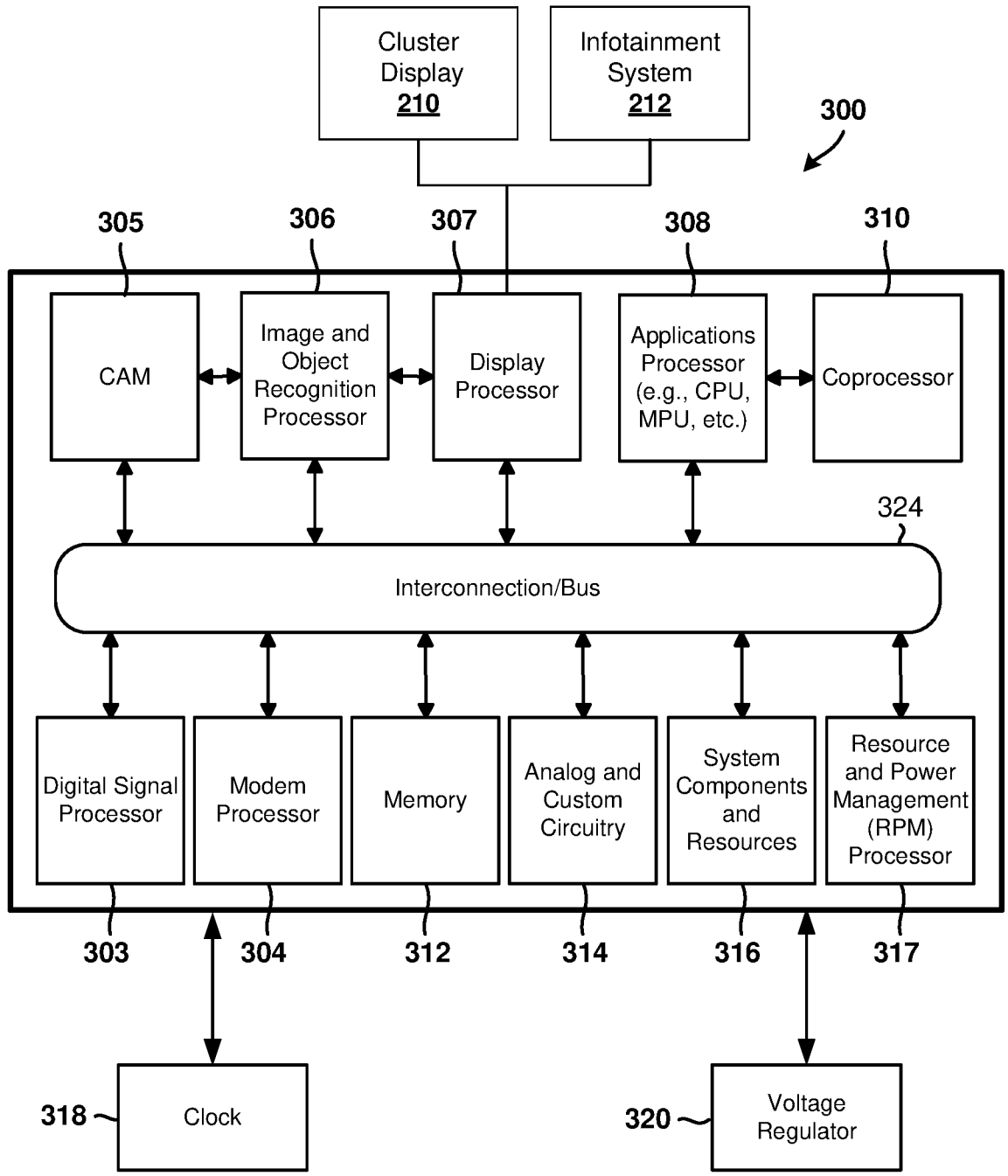
FIG. 3 is a block diagram illustrating components of a vehicle processing system suitable for use in implementing various embodiments.

FIG. 3 is a block diagram illustrating example components of a processing system 300 suitable for use in a vehicle processing system in accordance with various embodiments. With reference to FIGS. 1-3, the processing system 300 may include a number of heterogeneous processors, such as a digital signal processor (DSP) 303, a modem processor 304, an image and object recognition processor 306, a display processor 307, an applications processor 308, and a resource and power management (RPM) processor 317. The processing system 300 may also include one or more coprocessors 310 (e.g., vector co-processor) connected to one or more of the heterogeneous processors 303, 304, 306, 307, 308, 317.

Each of the processors in the processing system 300 may include one or more cores (i.e., multi-core processors), and an independent/internal clock. Each processor/core may perform operations independent of the other processors/cores. For example, the processing system 300 may include a processor that executes a first type of operating system (e.g., FreeBSD, LINUX, OS X, etc.) and a processor that executes a second type of operating system (e.g., Microsoft Windows). In some embodiments, the applications processor 308 may a main processor, central processing unit (CPU), microprocessor unit (MPU), arithmetic logic unit (ALU), or similar processor of the processing system 300. The graphics processor 306 may be graphics processing unit (GPU).

The processing system 300 may include analog circuitry and custom circuitry 314 for managing sensor data, analog-to-digital conversions, wireless data transmissions, and for performing other specialized operations, such as processing encoded audio and video signals for rendering in a web browser. The processing system 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing system 300 also include specialized circuitry for camera actuation and management (CAM) 305 that includes, provides, controls and/or manages the operations of one or more cameras (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

In some embodiments, the image and object recognition processor 306 may be configured with processor-executable instructions and/or specialized hardware configured to perform image processing and object recognition analyses involved in various embodiments. For example, the image and object recognition processor 306 may be configured to perform the operations of processing images received from cameras via the CAM 305 to recognize and/or identify other vehicles, and otherwise perform functions of the camera perception layer 224 as described.

The display processor 307 may be coupled to and configured to control the rendering of information on various vehicle displays such as the vehicle information cluster display 210 and infotainment display(s) 212.

The system components and resources 316, analog and custom circuitry 314, and/or CAM 305 may include circuitry to interface with peripheral devices, such as cameras, electronic displays, wireless communication devices, external memory chips, etc. The processors 303, 304, 306, 307, 308 may be interconnected to one or more memory elements 312, system components and resources 316, analog and custom circuitry 314, CAM 305, and RPM processor 317 via an interconnection/bus module 324, which may include an array of reconfigurable logic gates and/or implement a bus architecture (e.g., CoreConnect, AMBA, etc.). Communications may be provided by advanced interconnects, such as high-performance networks-on chip (NoCs).

The processing system 300 may further include an input/output module (not illustrated) for communicating with resources external to the processing system, such as a system clock 318 and a voltage regulator 320. Resources such as a system clock 318 and voltage regulator 320 may be shared by two or more of the processors/cores (e.g., a DSP 303, a modem processor 304, a graphics processor 306, an applications processor 308, etc.) of the processing system.

In some embodiments, the processing system 300 may be included in a control unit (e.g., 140) for use in a vehicle (e.g., 100). The control unit may include communication links for communications with a telephone network (e.g., 180), the Internet, and/or a network server (e.g., 184) as described.

The processing system 300 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, Wi-Fi®, etc.), and other well-known components of modern electronic devices.

Figure 4A:
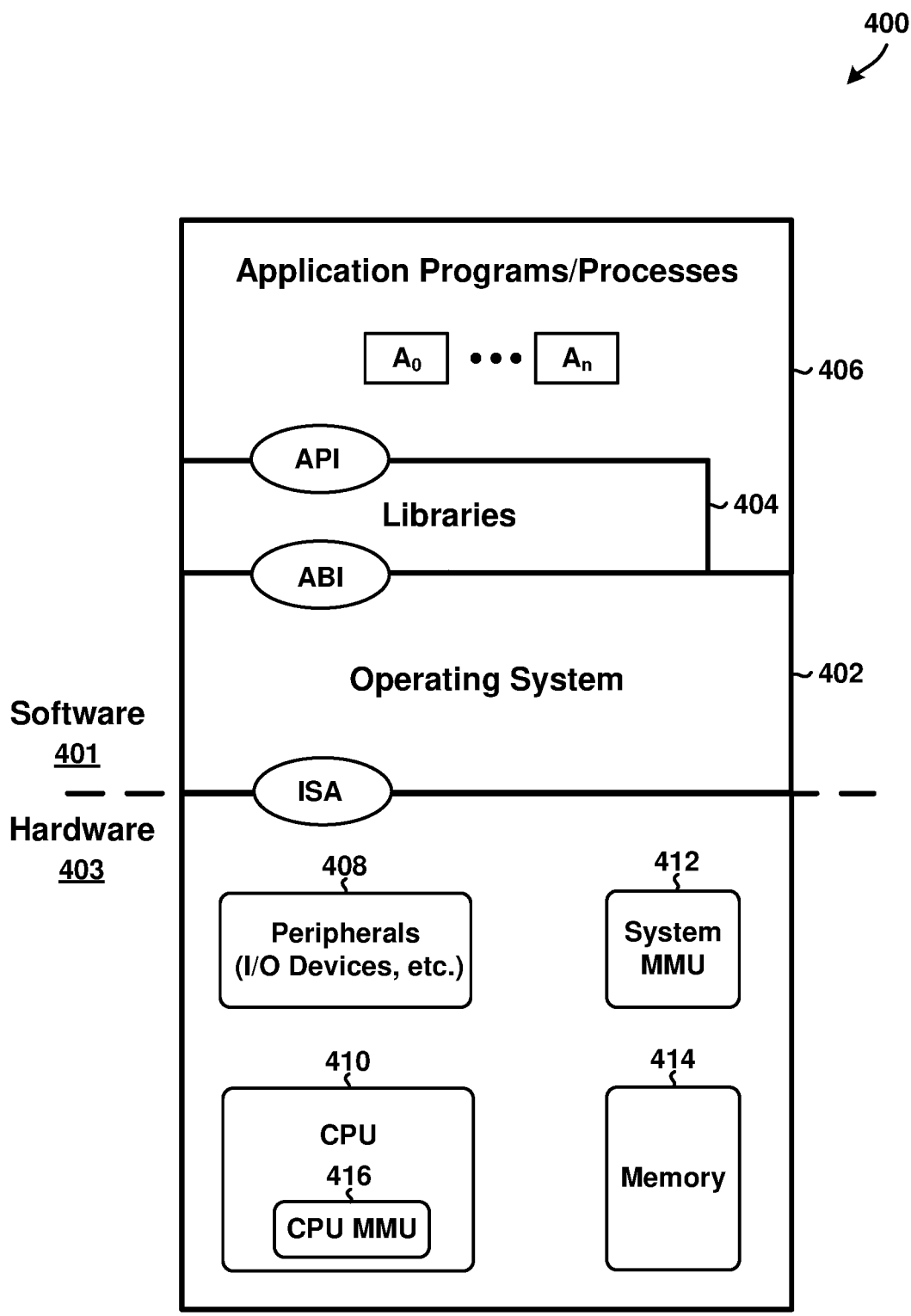
FIGS. 4A, 4B, and 4C are conceptual diagrams illustrating computing architectures including virtual machines suitable for implementing various embodiments.
Figure 4B:
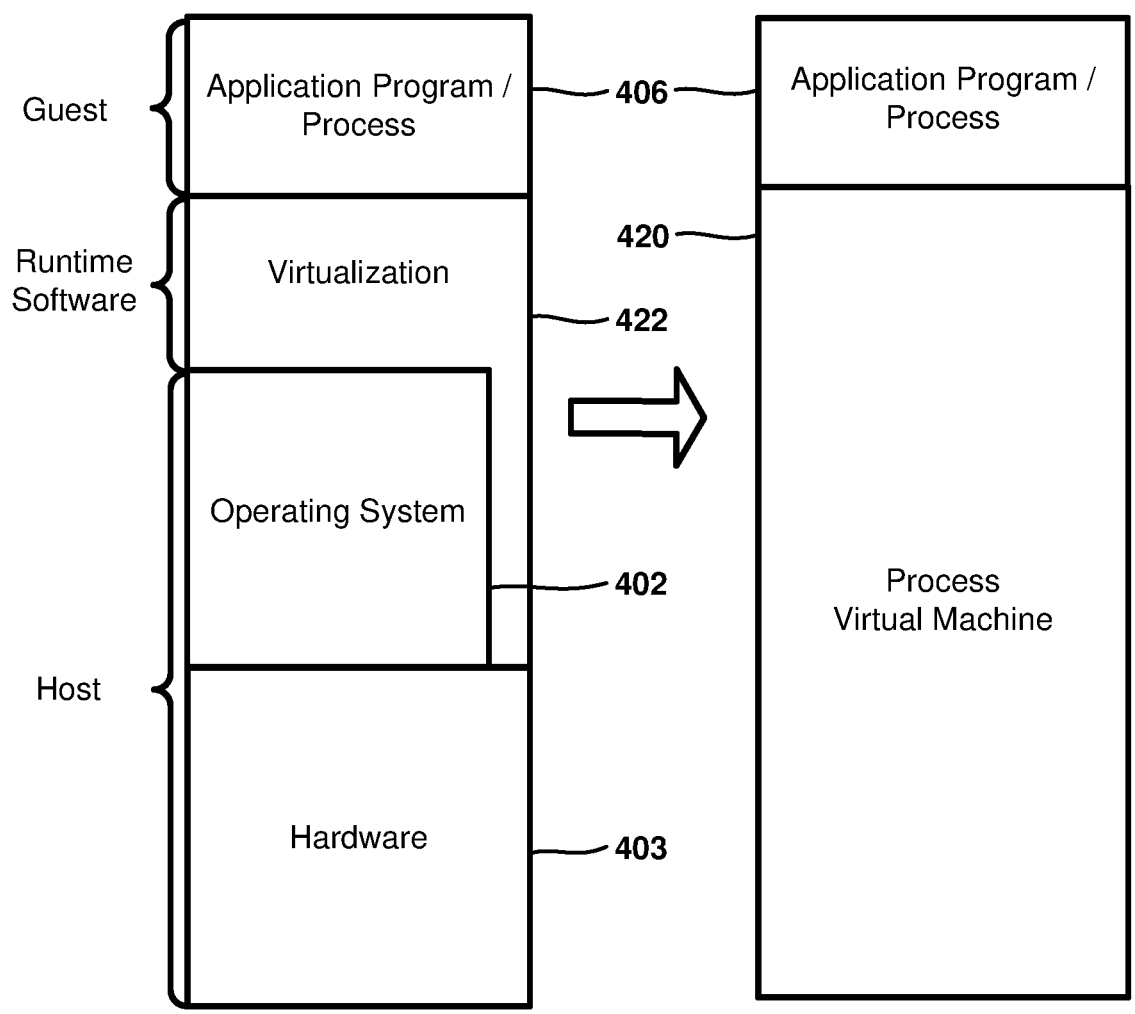
Figure 4C:
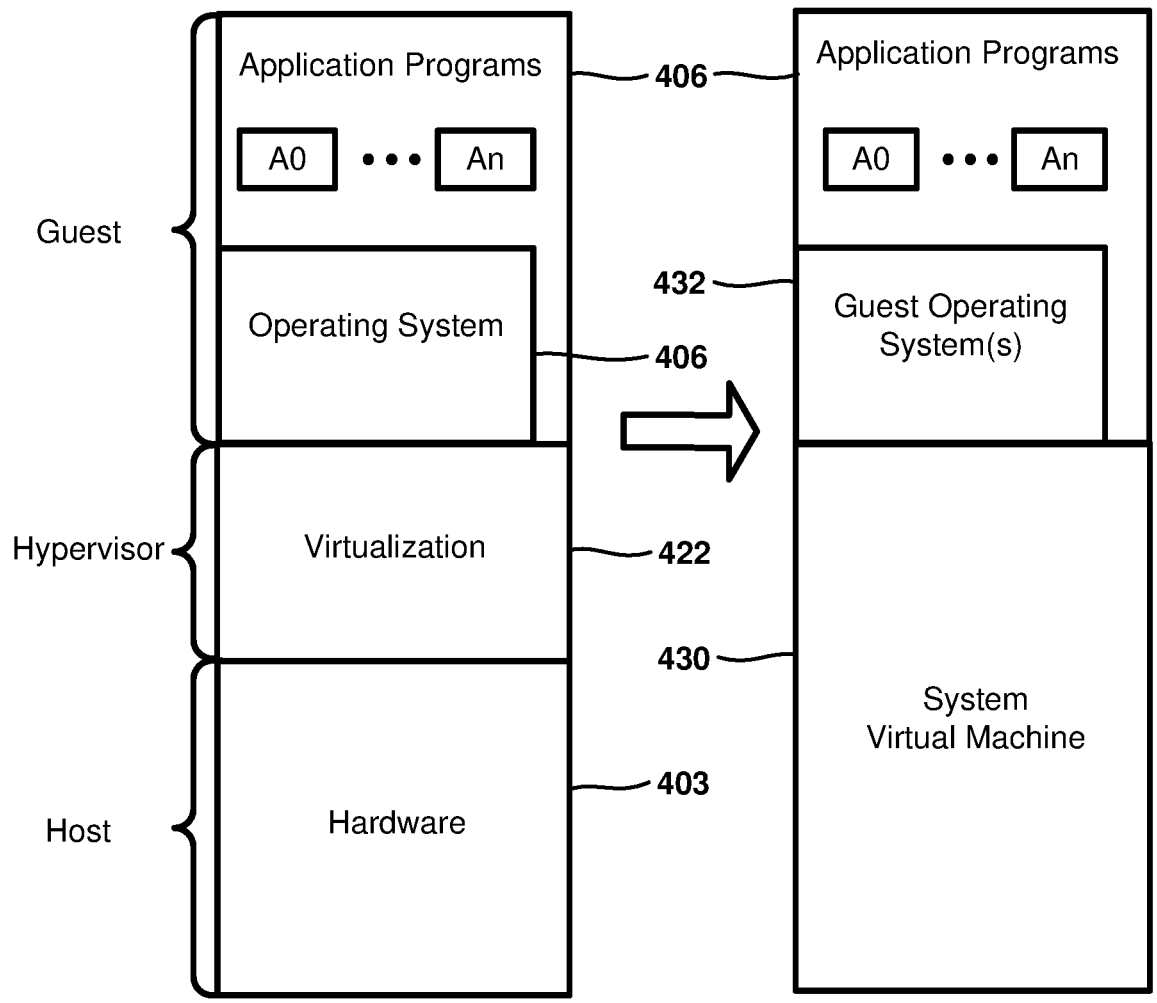

FIGS. 4A-4C illustrate example computing architectures suitable for use in some embodiments. With reference to FIG. 1-4C, a layered computer system architecture 400 may include both software components 401 and hardware components 403. The software components 401 may include an operating system 402, a library module 404, and one or more application programs (A0 through An) 406. The hardware components 403 may include peripherals 408 (e.g., hardware accelerators, input/output devices, etc.), a central processing unit (CPU) 410, a central processing unit memory management unit (CPU MMU) 416, one or more system memory management units (herein "system MMU" or "SMMU") 412, and one or more memories 414.

Application software written for mobile computing devices may be compiled into executable code, which is what is commonly referred to as "applications," "apps," or application programs 406. Each application program 406 may be a single process or thread, or may include a plurality of processes or threads.

Application programs 406 may issue high-level language (HLL) library calls to the library module 404 via an application program interface (API). The library module 404 may invoke services (e.g., via operating system calls) on the operating system 402 via an application binary interface (ABI). The operating system 402 may communicate with the hardware components using a specific instruction set architecture (ISA), which is a listing of specific operation codes (opcode) and native commands implemented by the hardware 403. In this manner, the instruction set architecture may define the hardware 403 as seen by the operating system 402.

The operating system 402 may be responsible for coordinating and controlling the allocation and use of the various memories 414 amongst the application programs 406, which may include partitioning the physical memory across the multiple application programs (A0-An) 406. In an embodiment, the operating system 402 may include one or more memory management systems (e.g., a virtual memory manager, etc.) for managing the allocation and use of system memory by the various application programs (A0 through An) 406. The memory management systems may function to ensure that the memory used by one process does not interfere with memory already in use by another process.

In an embodiment, the operating system 402 may include a virtual memory manager (OS VMM) configured to perform "virtual addressing" operations that enable the operating system 402 to make a particular physical address appear to be another address (i.e., a virtual address). The virtual addressing operations may include allocating virtual memory address to the application programs (A0-An) 406. Including a virtual memory manager within the operating system 402 may simplify the coordination and control of the system memory among the multiple processes or application programs (A0-An) 406.

In addition to the software-based memory management systems (e.g., OS VMM, etc.) discussed above, the system may include one or more hardware-based memory management systems, such as the CPU memory management unit (MMU) 416 and the system MMU 412. The CPU MMU 416 and the system MMU 412 may each include one or more hardware components responsible for performing various memory related operations, such as the translation of virtual addresses to physical addresses, cache control, bus arbitration, and memory protection. In an embodiment, the CPU MMU 416 may be responsible for providing address translation services and protection functionalities to the main CPU 410, and the system MMU 412 may be responsible for providing address translation services and protection functionalities to other hardware components (e.g., digital signal processor, modem processor, graphics processor, etc.).

In various embodiments, one or more of the memory management systems (e.g., system MMU 412, CPU MMU 416, etc.) may include a translation look-aside buffer (TLB), which is a cache memory that may be used for memory address translations (e.g., translating virtual addresses to physical addresses, etc.). In an embodiment, the TLB may be a content-addressable memory (CAM), which may be a hardware associative array memory in which stored information is organized into key-value format (e.g., hash table). The keys may be virtual addresses and the values may be physical addresses.

The various embodiments provide memory management systems that utilize virtualization techniques. Virtualization technologies enable the abstraction (or virtualization) of computing resources, which may be achieved by placing a control program (e.g., a Virtual Machine Monitor "VMM" or hypervisor) between the operating system and the hardware. Virtualization techniques are commonly implemented in a virtual machine (VM), which may be a software application that executes application programs like a physical hardware machine. The virtual machine provides an interface between application programs and the execution hardware, allowing application programs tied to a specific instruction set architecture to execute on hardware implementing a different instruction set architecture.

Virtual machines may be categorized into two general categories: system virtual machines and process virtual machines. System virtual machines allow the sharing of the underlying physical hardware between different processes or applications. Process virtual machines, on the other hand, may support a single process or application.

FIG. 4B is a layered architectural diagram illustrating the logical layers in a computing device implementing a process virtual machine 420. The virtualization component 422 may be a software component that runs on the operating system 402 and/or hardware 403. As discussed above with reference to FIG. 4A, hardware components are only visible to the application programs 406 through the operating system 402, and the ABI and API effectively define the hardware features available to the application programs 406. The virtualization component 422 may perform logical operations at the ABI/API level and/or emulate operating system calls or library calls such that the application programs 406 communicates with the virtualization component 422 in the same manner it would otherwise communicate with hardware components (i.e., via system/library calls). In this manner, the application programs 406 views the combination of the virtualization component 422, operating system 406, and hardware 403 as a single machine, such as the process virtual machine 420 illustrated in FIG. 4B. This simplifies the job of the application developer since application software need not be concerned with the actual architecture of computing devices on which the application will ultimately execute.

The process virtual machine 420 exists solely to support a single application program 406, and is therefore created with the process 402 and terminated when the process 402 finishes execution. The process 402 that runs on the virtual machine 410 is called the "guest" and the underlying platform is called the "host." Virtualization software 404 that implements the process virtual machine is typically called runtime software (or simply "runtime").

FIG. 4C is a layered architectural diagram illustrating the logical layers in a computing device implementing a system virtual machine 430. The computer system may include hardware components (e.g., execution hardware, memory, I/O devices, etc.) 403 and software components that include an application programs 406, an operating system 406, and a virtualization component 422. Software that runs on top of the virtualization component 422 is referred to as "guest" software and the underlying platform that supports the virtualization module is referred to as "host" hardware.

Unlike process virtual machines, a system virtual machine 430 provides a complete environment on which multiple "guest" operating systems 432 can coexist. Likewise, the host hardware platform may be configured to simultaneously support multiple, isolated guest operating system environments. The isolation between the concurrently executing operating systems adds a level of security to the system. For example, if security on one guest operating system is breached, or if one guest operating system suffers a failure, the software running on other guest systems is not affected by the breach/failure. The host hardware platform also simplifies the job of the application developer since application software need not be concerned with the actual architecture of computing devices on which the application will ultimately execute.

The virtualization component 422 may be logically situated between the host hardware and the guest software. The virtualization software may run on the actual hardware (native) or on top of an operating system (hosted), and is typically referred to as a "hypervisor" or virtual machine monitor (VMM). In native configurations, the virtualization software runs on the actual hardware in the highest privilege mode available, and the guest operating systems run with reduced privileges such that the virtualization software can intercept and emulate all guest operating system actions that would normally access or manipulate the hardware resources. In hosted configurations, the virtualization software runs on top of an existing host operating system, and may rely on the host operating system to provide device drivers and other lower-level services. In either case, the guest operating systems 432 communicate with the virtualization component 422 in the same manner they would communicate with the physical hardware 403, viewing the combination of the virtualization component 422 and hardware 403 as a single, virtual machine 430. This allows each guest operating system 432 to operate under the illusion of having exclusive access to processors, peripherals, I/O, MMUs, and memories in the hardware 403.

Figure 5A:
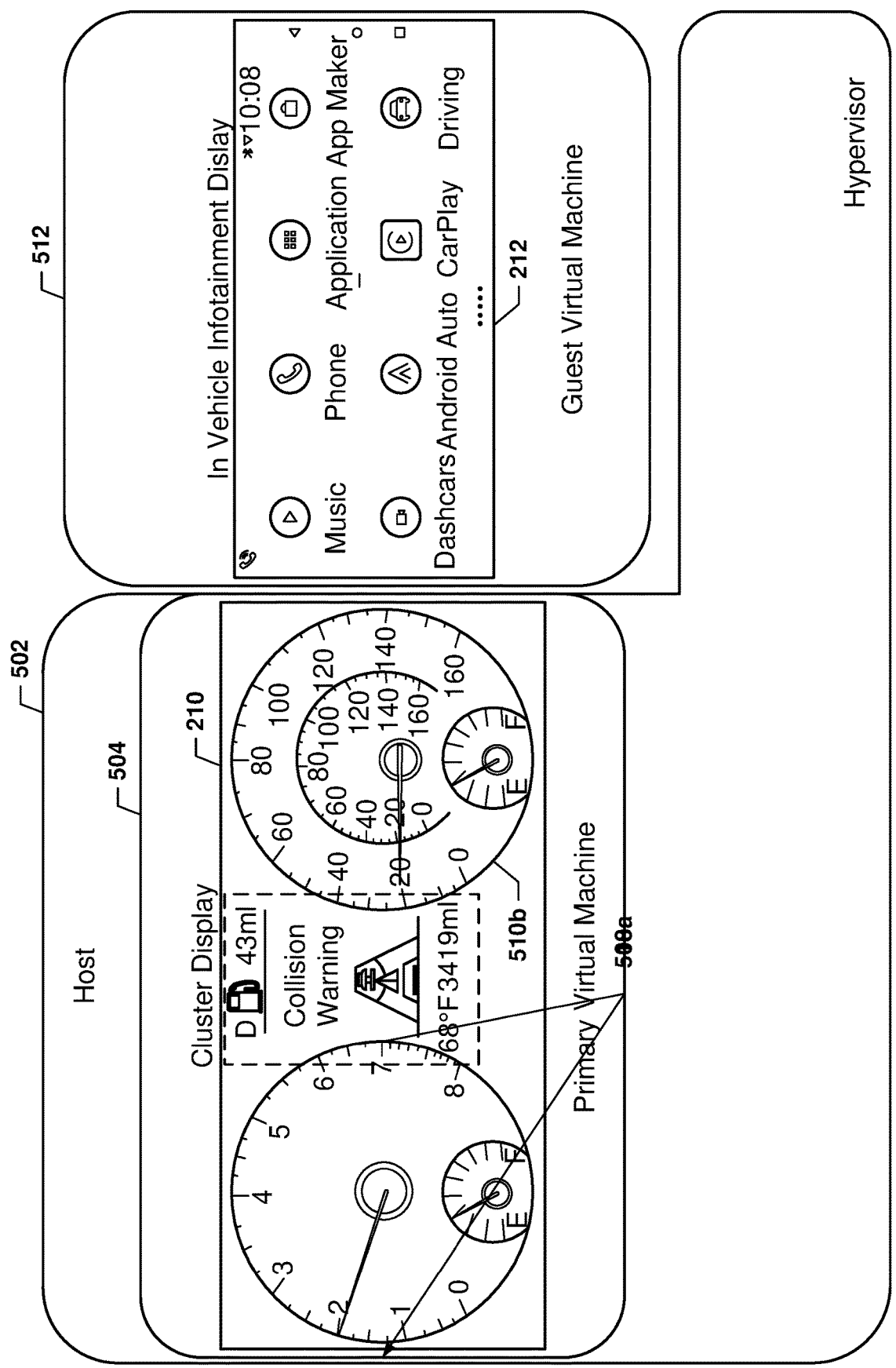
FIGS. 5A and 5B are schematic representations of a vehicle information cluster display and an vehicle entertainment display and virtual machines supporting each of displays suitable for implementing various embodiments.
Figure 5B:
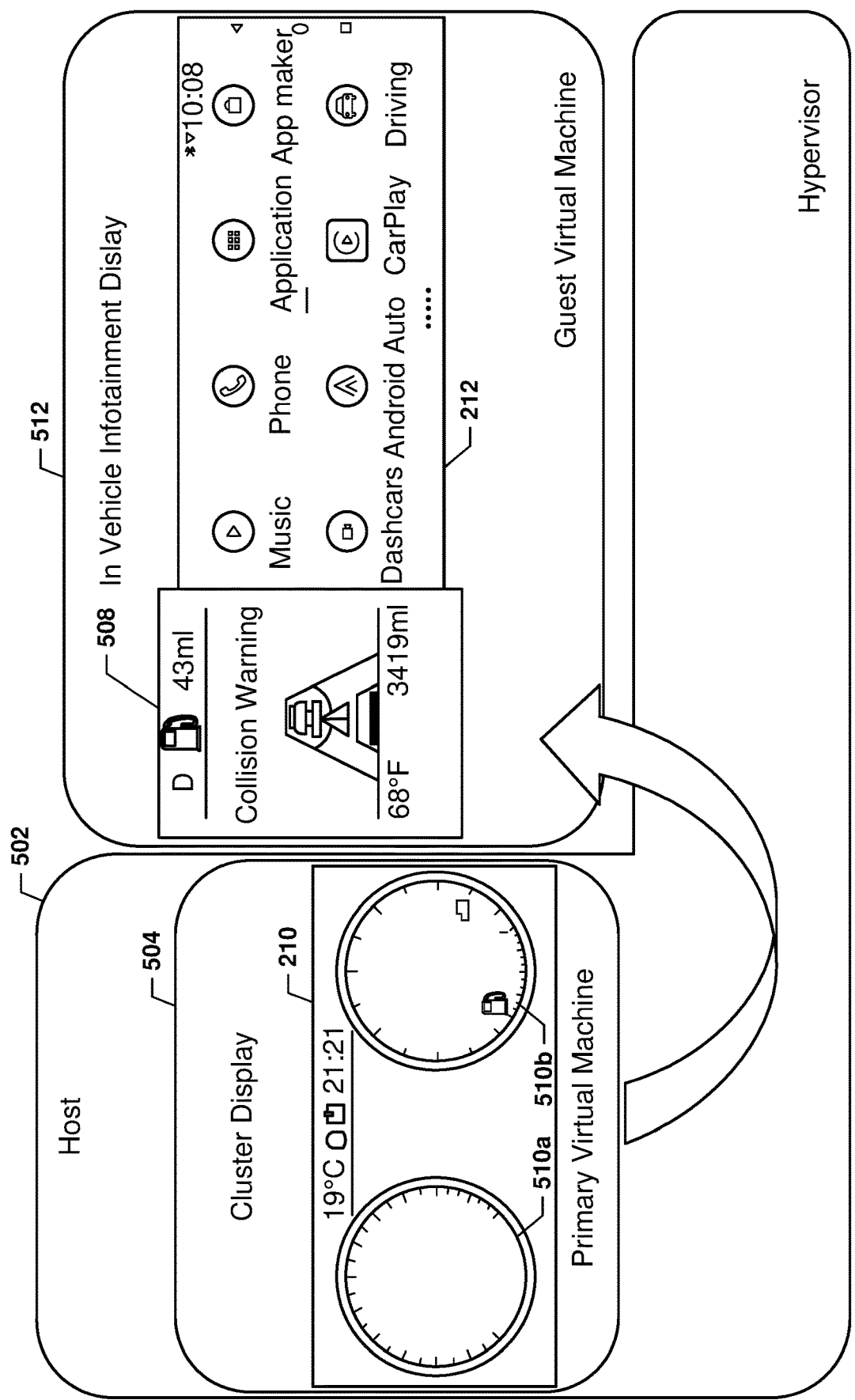

FIGS. 5A and 5B are schematic representations of a vehicle information cluster display, an vehicle entertainment display and virtual machines supporting each of displays. FIGS. 5A and 5B illustrate how safety critical information may be moved from the cluster display to the infotainment display in the event that the cluster display fails.

Referring to FIG. 5A, a host machine 502 including a hypervisor may support a primary virtual machine 504 that performs many of the ADAS functionality including presenting vehicle status and critical safety information on a cluster display 210. In normal operations, such a cluster display 210 may include a region of interest 508 in which safety critical information is presented, such as collision warnings, fuel status information, outside temperature and other information. The cluster display may also include more routine vehicle information, such displaying graphics of a speedometer 510a and tachometer 510b.

Vehicle systems may also include a vehicle infotainment system, which may operate on a guest virtual machine 512 that executes within the processing system of the vehicle (such as the host 502). In particular, the guest virtual machine 512 may render information or icons related to entertainment systems, noncritical vehicle information, and various applications, such as applications for configuring various vehicle subsystems (e.g., configuring Bluetooth® connections and connected devices).

Referring to FIG. 5B, safety critical information may no longer be presented on the vehicle information cluster display 504 in the event of a malfunction of that display. In various embodiments, when such a condition is detected, the vehicle processing system may move the safety critical information 508 to be displayed on the vehicle infotainment display 212 (or another vehicle display). As described herein, this process may involve the primary virtual machine notifying the guest virtual machine of the need to present the safety critical information, as well as identifying and/or providing access to the memory location in which the primary virtual machine is storing the critical safety information that needs to be displayed.

In some embodiments, the safety critical information to be rendered on the infotainment display may be identified in terms of a region of interest 508 on the cluster display. In such implementations, the primary virtual machine 504 may inform the guest virtual machine 512 of the memory location of the data for rendering the region of interest, which may include granting the guest virtual machine access to that memory. The guest virtual machine 512 may access that memory location and use the data for rendering the region of interest on the infotainment display. As part of this process, the guest virtual machine 512 may adjust the rendering of infotainment information 212 to make room to accommodate the region of interest 508 including the safety critical information as illustrated in FIG. 5B.

Figure 6A:
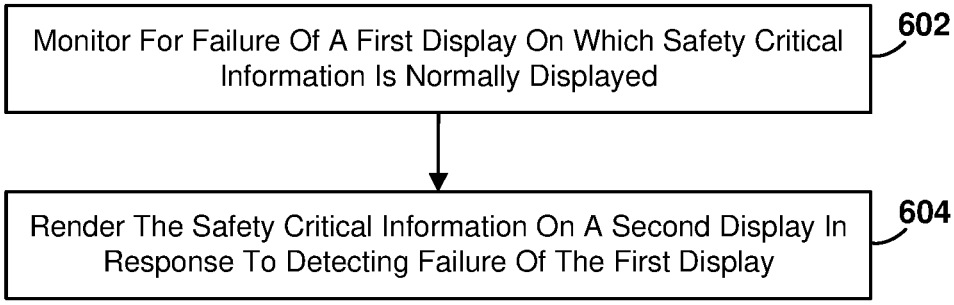
FIG. 6A is a process flow diagram illustrating an embodiment method performed by a processor of a vehicle processing system in a vehicle for dynamically adjusting information presented to a driver in accordance with various embodiments.

FIG. 6A is a process flow diagram illustrating an example method 600a performed by a vehicle processing system for managing the display of vehicle critical safety information on displays of a vehicle when a primary display (e.g., the vehicle information cluster display 210) malfunctions in accordance with various embodiments. With reference to FIGS. 1-6A, means for performing operations of the method 600a may include a processing system as described herein. A processing system may include one or more processors (e.g., 207, 303, 304, 306, 307, 308, 310) of a vehicle processing system (e.g., 104, 100, 200, 300) and/or hardware elements, any one or combination of which may be configured to perform any of the operations of the method 600a. Further, one or more processors within a processing system may be configured with software or firmware to perform various operations of the method. To encompass any of the processor(s), hardware elements and software elements that may be involved in performing the method 600a, the elements performing method operations are referred to generally as a "processing system."

In block 602, the processing system may monitor for failure of a first display on which safety critical information is normally displayed. For example, the processing system may monitor various system data and/or hardware status information to identify when the vehicle information cluster display 210 (or a similar primary safety information display) is malfunctioning in a manner that prevents a driver from viewing the information. Examples of conditions that could prevent displaying critical safety information include failure of the display, failure of a display driver, disconnection of the display or a data cable providing display data, and similar conditions. The operations of monitoring the first display (e.g., cluster display) may be performed periodically (e.g., every few milliseconds or seconds) during normal operation so that a display failure may be detected and the corrective actions of various embodiments taken so that the time the safety critical information is unavailable to the driver is minimized. For example, using method described with reference to FIG. 6C, a failure of the cluster display could be detected within one or a few frames, and thus within fractions of a second, enabling the corrective action of moving the safety critical information to the second display (e.g., infotainment display) may be accomplished before the driver becomes aware that the information is no longer visible.

In block 604, the processing system may perform operations to render the safety critical information on a second display in response to detecting failure of the first display. For example, the processing system may perform operations that cause the safety critical information to be rendered on a portion of a vehicle infotainment display (e.g., 212). Examples of operations that may be performed in block 604 are described in more detail with reference to FIG. 6D.

Figure 6B:
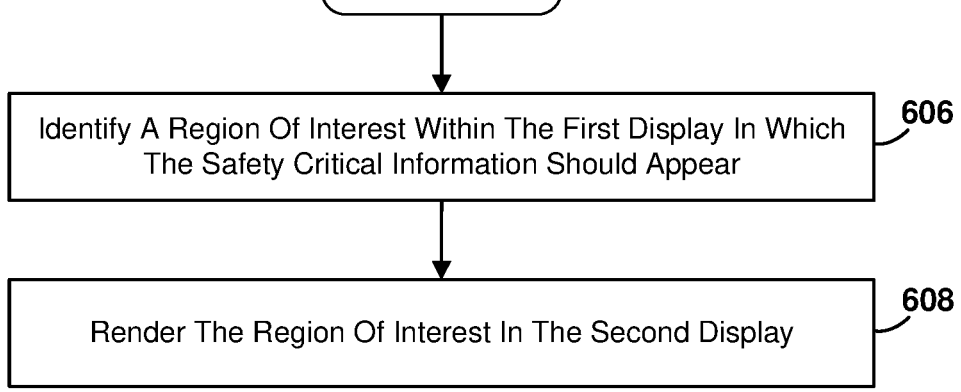
FIGS. 6B-6D are process flow diagrams of illustrating example operations that may be performed as part of the embodiment method illustrated in FIG. 6A in accordance with various embodiments.
Figure 6C:
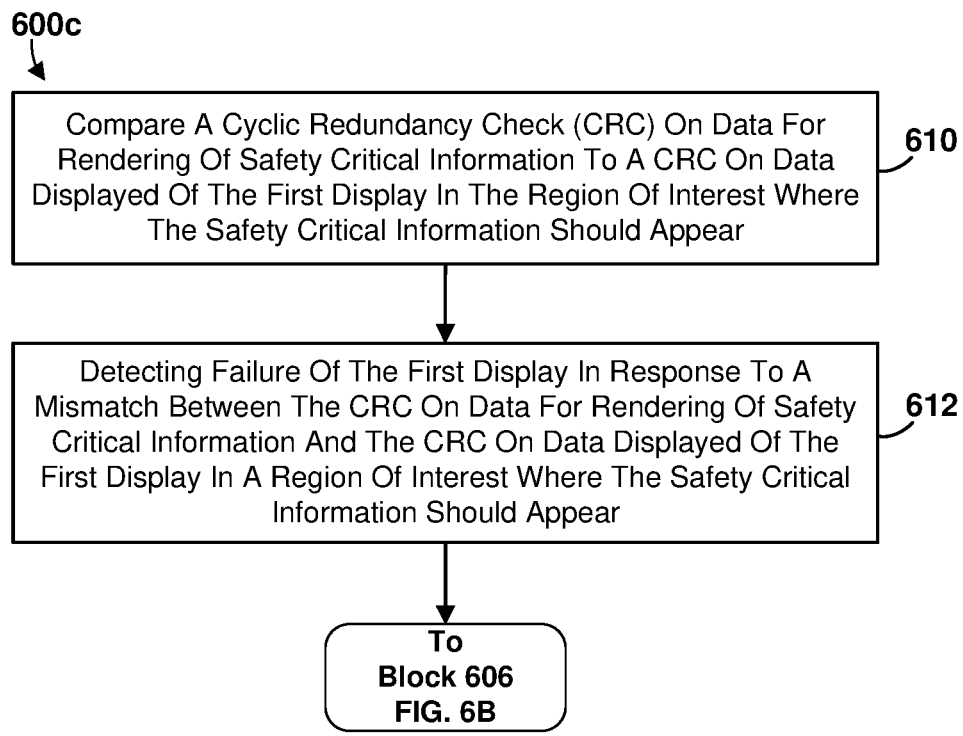
Figure 6D:
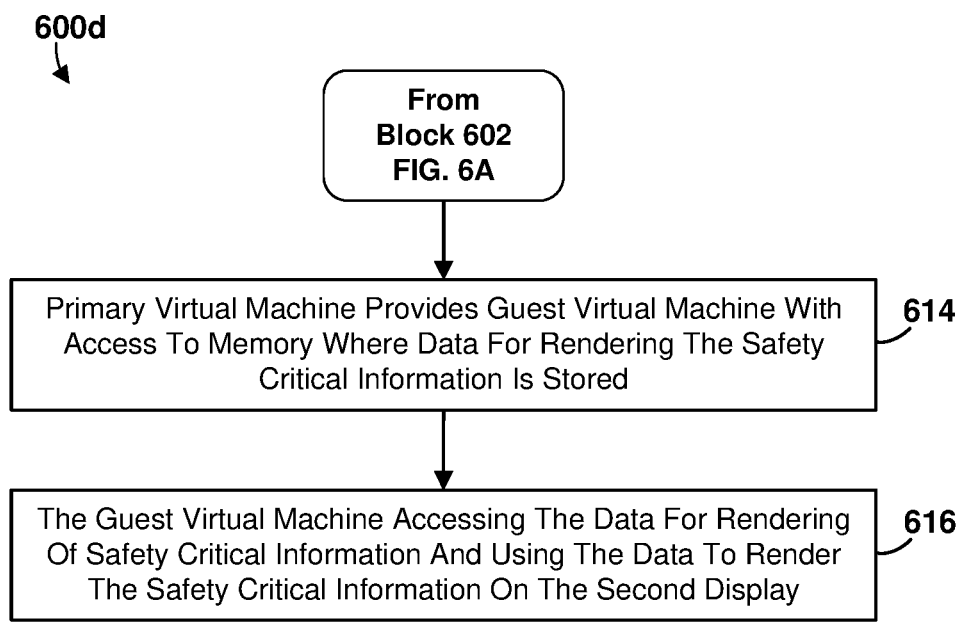

FIGS. 6B-6D are process flow diagrams of example operations 600b-600d that may be performed as part of the method 600a performed by a vehicle processing system in accordance with some embodiments. With reference to FIGS. 1-6D, means for performing the operations 600b-600d may include a processing system as described herein. A processing system may include one or more processors (e.g., 207, 303, 304, 306, 307, 308, 310) of a vehicle processing system (e.g., 104, 100, 200, 300) and/or hardware elements, any one or combination of which may be configured to perform any of the operations 600b-600e of the method 600a. Further, one or more processors within a processing system may be configured with software or firmware to perform various operations of the method. To encompass any of the processor(s), hardware elements and software elements that may be involved in performing the operations 600b-600d, the elements performing method operations are referred to generally as a "processing system."

Referring to FIG. 6B, in response to recognizing a failure of the first display (e.g., the vehicle information cluster display 210) in block 602, the processing system may identifying a region of interest within the first display in which the safety critical information should appear in block 606. Identifying the region of interest of the safety critical information may be accomplished as part of the processes by which the vehicle processing system generate the data used for rendering images within the cluster display. The operations in block 606 may include storing in memory the data used for rendering the region of interest including the safety critical information.

In block 608, the processing system may render the region of interest that includes the safety critical information in the second display (e.g., the infotainment display 212). As described with reference to FIG. 6D, the operations in block 608 may include providing the address and/or access to the memory addresses in which are stored the data used for rendering the region of interest.

Referring to FIG. 6C, a non-limiting example of a method that the processing system may use to recognize a malfunction or failure of the first display (e.g., vehicle information cluster display 210) is by comparing the cyclic redundancy check (CRC) value on data that has been generated or in memory for rendering the region of interest including the safety critical information to the CRC value on data that is displayed on the first display. CRC values are used in all data transfers within the systems of the vehicle to recognize and recover from errors in transmission that can occur as data is transmitted from one component (e.g., the processing system or memory) to another component (e.g., the vehicle information cluster display 210). Data networks and data connections within vehicles are subject to electronic noise from many components within the vehicle, which requires the processing system to monitor CRC values to detect transmission errors. In the application of rendering information on an electronic display (e.g., the vehicle information cluster display 210) CRC values may be appended to the data as it is stored in memory and transmitted to the display and CRC values may be determined upon receipt by the display so that errors in transmission can be detected. If there is a malfunction of the display, the CRC values of the region of interest from the display will not match the CRC value of the data used for rendering the region of interest. Further, if the display is disconnected or powered down, there will be no CRC value returned from the display, which will also be recognized as a mismatch in CRC values.

In block 610, the processing system may compare a cyclic redundancy check (CRC) on data for rendering of safety critical information to a CRC on data displayed of the first display (e.g., the vehicle information cluster display 210) in the region of interest where the safety critical information should appear. The two CRC values may be available to the processing system so this comparison may be as simple as subtracting two values available in memory or registers to determine whether there is a remainder.

In block 612, the processing system may detect a failure of the first display (e.g., the vehicle information cluster display 210) in response to a mismatch between the CRC on data for rendering of safety critical information and the CRC on data displayed of the first display (e.g., the vehicle information cluster display 210) in a region of interest where the safety critical information should appear. In response to such a detection, the processing system may perform the operations in block 606 as described.

The processes of the method 600c may be repeated every time CRC values are generated for transmitting data for rendering the region of interest to the first display.

As described, in some implementations the vehicle processes related to displaying safety critical information on a first display (e.g., the vehicle information cluster display 210) may be performed by a primary virtual machine (e.g., 504) executing in the vehicle processing system, while the infotainment system executes in a guest virtual machine (e.g., 512) that controls the infotainment display. In such an architecture, the guest virtual machine of the infotainment system may not have access under normal operating conditions to the memory in which are stored the data for rendering critical safety information on the primary display. As the two virtual machines may operate in the same host physical machine and thus have physical access to the same memory, a hypervisor executing in the host machine may control memory access by each virtual machine to provide data security and avoid vehicle critical data from being corrupted or overwritten by non-critical systems, such as the infotainment system. Thus, to enable the operations of various embodiments, the guest virtual machine controlling the infotainment display must be provided access to the data for rendering the region of interest containing the critical safety information.

Referring to FIG. 6D, after the processing system recognizes that there is or has been a malfunction in the first display (e.g., the vehicle information cluster display 210), the primary virtual machine (e.g., 504) that controls the first display (e.g., the vehicle information cluster display 210) may provide the guest virtual machine (e.g., 512) with access to the memory where data for rendering the safety critical information is stored in block 614. In some implementations, this may be accomplished by placing the memory address information in a buffer or memory that is accessed by a display driver function within the guest virtual machine. In some implementations, this may be accomplished by providing the memory address information to the guest virtual machine in a message, such as an interrupt or process-to-process data transfer. In some implementations of the hypervisor and virtual machines, the operations in block 614 may include the primary virtual machine and/or the hypervisor giving the guest virtual machine access to the memory where data for rendering the safety critical information is stored.

Having received the address of and access to the memory where data for rendering the safety critical information is stored, the guest virtual machine may access that data and use the data to render the safety critical information on the second display in block 616.

In some embodiments, as part of using the data for rendering the safety critical information the guest virtual machine may determine an display size of the region of interest based on the data, and then use that information to fit the region of interest into the second display (e.g., into the infotainment display 212). This may involve the guest virtual machine rearranging or resizing images within the infotainment display to make room for the region of interest containing the safety critical information.

Implementation examples are described in the following paragraphs. While some of the following implementation examples are described in terms of example methods, further example implementations may include: the example methods discussed in the following paragraphs implemented by a vehicle processing system that may be an on-board unit, mobile device unit, or mobile computing unit, or a processing system of a network computing device, including a processor configured with processor-executable instructions to perform operations of the methods of the following implementation examples; the example methods discussed in the following paragraphs implemented by a vehicle processing system or a processing system of a network computing device including means for performing functions of the methods of the following implementation examples; and the example methods discussed in the following paragraphs may be implemented as a non-transitory processor-readable storage medium having stored thereon processor-executable instructions configured to cause a processor of a vehicle processing system or a network computing device processing system to perform the operations of the methods of the following implementation examples.

Example 1. A method performed by a vehicle processing system for managing display of vehicle safety critical information on displays of a vehicle, including: monitoring for failure of a first display on which safety critical information is normally displayed; and rendering the safety critical information on a second display in response to detecting failure of the first display.

Example 2. The method of example 1, in which rending the safety critical information on the second display in response to detecting failure of the first display includes: identifying a region of interest within the first display in which the safety critical information should appear; and rendering the region of interest in the second display.

Example 3. The method of example 2, in which in monitoring for failure of the first display includes: comparing a cyclic redundancy check (CRC) on data for rendering of safety critical information to a CRC on data displayed of the first display in the region of interest where the safety critical information should appear; and detecting failure of the first display in response to a mismatch between the CRC on data for rendering of safety critical information and the CRC on data displayed of the first display in the region of interest where the safety critical information should appear.

Example 4. The method of either of examples 2 or 3, in which the safety critical information is a fraction of information that is or should be displayed on the first display and the region of interest is a fraction of the first display encompassing the safety critical information.

Example 5. The method of any of examples 1-4, in which the first display is a vehicle status cluster display and the second display is an infotainment display.

Example 6. The method of example 5, in which: generation of safety critical information and rendering of the safety critical information on the first display is controlled by a primary virtual machine executing in a processing system of the vehicle; the infotainment display is controlled by a guest virtual machine executing in the processing system of the vehicle; and rending the safety critical information on the second display includes: the primary virtual machine providing to the guest virtual machine with access to memory where data for rendering the safety critical information is stored; and the guest virtual machine accessing the data for rendering of safety critical information and using the data to render the safety critical information on the second display.

Example 7. The method of example 6, in which rending the safety critical information on the second display further includes the guest virtual machine allocating a fraction of the infotainment display for rendering the safety critical information and adjusting rendering of infotainment related information.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a vehicle processing system for managing display of vehicle safety critical information on displays of a vehicle, comprising:
   monitoring for failure of a first display on which safety critical information is normally displayed; and
   rendering the safety critical information on a second display in response to detecting failure of the first display;
   wherein the first display is a vehicle status cluster display and the second display is an infotainment display;
   wherein:
      generation of safety critical information and rendering of the safety critical information on the first display is controlled by a primary virtual machine executing in a processing system of the vehicle;
      the infotainment display is controlled by a guest virtual machine executing in the processing system of the vehicle; and
      rending the safety critical information on the second display comprises:
         the primary virtual machine providing to the guest virtual machine with access to memory where data for rendering the safety critical information is stored; and
         the guest virtual machine accessing the data for rendering of safety critical information and using the data to render the safety critical information on the second display.

2. The method of claim 1, wherein rending the safety critical information on the second display in response to detecting failure of the first display comprises:
   identifying a region of interest within the first display in which the safety critical information should appear; and
   rendering the region of interest in the second display.

3. The method of claim 2, wherein in monitoring for failure of the first display comprises:
   comparing a cyclic redundancy check (CRC) on data for rendering of safety critical information to a CRC on data displayed of the first display in the region of interest where the safety critical information should appear; and
   detecting failure of the first display in response to a mismatch between the CRC on data for rendering of safety critical information and the CRC on data displayed of the first display in the region of interest where the safety critical information should appear.

4. The method of claim 2, wherein the safety critical information is a fraction of information that is or should be displayed on the first display and the region of interest is a fraction of the first display encompassing the safety critical information.

5. The method of claim 1, wherein rending the safety critical information on the second display further comprises the guest virtual machine allocating a fraction of the infotainment display for rendering the safety critical information and adjusting rendering of infotainment related information.

6. A vehicle, comprising:
   one or more memories;
   a first display on which safety critical information is normally displayed;
   a second display; and
   a processing system coupled to the one or more memories, first display and second display, and comprising one or more processors configured to:
      monitor for failure of the first display; and
      rendering the safety critical information on the second display in response to detecting failure of the first display;
   wherein the first display is a vehicle status cluster display and the second display is an infotainment display;
   wherein:
      generation of safety critical information and rendering of the safety critical information on the first display is controlled by a primary virtual machine executing in the processing system;
      the infotainment display is controlled by a guest virtual machine executing in the processing system; and
      the one or more processors of the processing system is further configured to render the safety critical information on the second display by:
         the primary virtual machine providing to the guest virtual machine with access to memory where data for rendering the safety critical information is stored; and
         the guest virtual machine accessing the data for rendering of safety critical information and using the data to render the safety critical information on the second display.

7. The vehicle of claim 6, wherein the one or more processors of the processing system is further configured to render the safety critical information on the second display in response to detecting failure of the first display by:
   identifying a region of interest within the first display in which the safety critical information should appear; and
   render the region of interest in the second display.

8. The vehicle of claim 7, wherein the one or more processors of the processing system is further configured to monitor for failure of the first display by:
   comparing a cyclic redundancy check (CRC) on data for rendering of safety critical information to a CRC on data displayed of the first display in the region of interest where the safety critical information should appear; and
   detecting failure of the first display in response to a mismatch between the CRC on data for rendering of safety critical information and the CRC on data displayed of the first display in the region of interest where the safety critical information should appear.

9. The vehicle of claim 7, wherein the safety critical information is a fraction of information that is or should be displayed on the first display and the region of interest is a fraction of the first display encompassing the safety critical information.

10. The vehicle of claim 6, wherein the one or more processors of the processing system is further configured to render the safety critical information on the second display by causing the guest virtual machine to allocate a fraction of the infotainment display for rendering the safety critical information and adjusting rendering of infotainment related information.

11. A vehicle processing system, comprising:
one or more memories;
one or more processors configured to:
  monitor for failure of a first display on which safety critical information is normally displayed; and
  render the safety critical information on the second display in response to detecting failure of the first display;
wherein the first display is a vehicle status cluster display and the second display is an infotainment display;
wherein:
  generation of safety critical information and rendering of the safety critical information on the first display is controlled by a primary virtual machine executing in the processing system;
  the infotainment display is controlled by a guest virtual machine executing in the processing system; and
  the one or more processors of the processing system is further configured to render the safety critical information on the second display by:
    the primary virtual machine providing to the guest virtual machine with access to memory where data for rendering the safety critical information is stored; and
    the guest virtual machine accessing the data for rendering of safety critical information and using the data to render the safety critical information on the second display.

12. The vehicle processing system of claim 11, wherein the one or more processors is further configured to render the safety critical information on the second display in response to detecting failure of the first display by:
identifying a region of interest within the first display in which the safety critical information should appear; and
rendering the region of interest in the second display.

13. The vehicle processing system of claim 12, wherein the one or more processors is further configured to monitor for failure of the first display by:
comparing a cyclic redundancy check (CRC) on data for rendering of safety critical information to a CRC on data displayed of the first display in the region of interest where the safety critical information should appear; and
detecting failure of the first display in response to a mismatch between the CRC on data for rendering of safety critical information and the CRC on data displayed of the first display in the region of interest where the safety critical information should appear.

14. The vehicle processing system of claim 12, wherein the safety critical information is a fraction of information that is or should be displayed on the first display and the region of interest is a fraction of the first display encompassing the safety critical information.

15. The vehicle processing system of claim 11, wherein the one or more processors is further configured to render the safety critical information on the second display by causing the guest virtual machine to allocate a fraction of the infotainment display for rendering the safety critical information and adjusting rendering of infotainment related information.

16. A non-transitory processor-readable medium having stored thereon processor-executable instructions configured to cause a vehicle processing system to perform operations comprising:
monitoring for failure of a first display on which safety critical information is normally displayed; and
rendering the safety critical information on a second display in response to detecting failure of the first display;
wherein the first display is a vehicle status cluster display and the second display is an infotainment display;
wherein:
  generation of safety critical information and rendering of the safety critical information on the first display is controlled by a primary virtual machine executing in the vehicle processing system;
  the infotainment display is controlled by a guest virtual machine executing in the vehicle processing system; and
  the stored processor-executable instructions are further configured to cause the vehicle processing system to perform operations such that rending the safety critical information on the second display comprises:
    the primary virtual machine providing to the guest virtual machine with access to memory where data for rendering the safety critical information is stored; and
    the guest virtual machine accessing the data for rendering of safety critical information and using the data to render the safety critical information on the second display.

17. The non-transitory processor-readable medium of claim 16, wherein the stored processor-executable instructions are further configured to cause the vehicle processing system to perform operations such that rending the safety critical information on the second display in response to detecting failure of the first display comprises:
identifying a region of interest within the first display in which the safety critical information should appear; and
rendering the region of interest in the second display.

18. The non-transitory processor-readable medium of claim 17, wherein the stored processor-executable instructions are further configured to cause the vehicle processing system to perform operations such that monitoring for failure of the first display comprises:
comparing a cyclic redundancy check (CRC) on data for rendering of safety critical information to a CRC on data displayed of the first display in the region of interest where the safety critical information should appear; and
detecting failure of the first display in response to a mismatch between the CRC on data for rendering of safety critical information and the CRC on data displayed of the first display in the region of interest where the safety critical information should appear.

19. The non-transitory processor-readable medium of claim 17, wherein the safety critical information is a fraction of information that is or should be displayed on the first display and the region of interest is a fraction of the first display encompassing the safety critical information.

20. The non-transitory processor-readable medium of claim 16, wherein the stored processor-executable instructions are further configured to cause the vehicle processing system to perform operations such that rending the safety critical information on the second display further comprises the guest virtual machine allocating a fraction of the infotainment display for rendering the safety critical information and adjusting rendering of infotainment related information.

* * * * *